United States Patent
Piehler et al.

(10) Patent No.: US 10,690,878 B2
(45) Date of Patent: *Jun. 23, 2020

(54) ARRANGEMENT FOR SUPPORTING AN OPTICAL COMPONENT

(71) Applicant: Jabil Optics Germany GmbH, Jena (DE)

(72) Inventors: Eberhard Piehler, Lehesten OT Nerkewitz (DE); Bjoern Hauer, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,677

(22) Filed: Jul. 31, 2019

(65) Prior Publication Data

US 2019/0353869 A1    Nov. 21, 2019

Related U.S. Application Data

(63) Continuation of application No. 15/210,471, filed on Jul. 14, 2016, now Pat. No. 10,409,024.

(30) Foreign Application Priority Data

Jul. 14, 2015 (DE) .......... 10 2015 111 375

(51) Int. Cl.
  *G02B 7/02*    (2006.01)
  *G02B 27/00*    (2006.01)

(52) U.S. Cl.
  CPC ............ *G02B 7/028* (2013.01); *G02B 7/022* (2013.01); *G02B 27/0025* (2013.01)

(58) Field of Classification Search
  CPC ..... G02B 7/028; G02B 27/0025; G02B 7/022
  See application file for complete search history.

(56) References Cited

U.S. PATENT DOCUMENTS

| 4,268,123 A | 5/1981 | Mesco |
| 4,506,951 A | 3/1985 | Yamada |

(Continued)

FOREIGN PATENT DOCUMENTS

| DE | 102013209814 A1 | 11/2014 |
| JP | S59-75217 A | 4/1984 |

(Continued)

OTHER PUBLICATIONS

Zhang, Zhiyi et al. "Thermo-optic coefficients of polymers for optical waveguide applications", Polymer 47, pp. 4893-4896 (2006).

*Primary Examiner* — Alicia M Harrington
(74) *Attorney, Agent, or Firm* — Young Basile Hanlon & MacFarlane, P.C.

(57) ABSTRACT

An optical arrangement including an optical component with a basic body and at least one retaining element, which is designed as an integral element of the optical component or which is actively connected to the optical component is disclosed. The retaining element is affixed on a first contact position of the basic body and a carrier, on which the optical component is supported by means of the retaining element. The retaining element is affixed on a second contact position of the carrier and is arranged in such a manner that it can be pivoted between a first contact position and a second contact position. The arrangement is conducted in such a manner that during a thermal expansion of the basic body in the direction of the carrier and/or with a thermal expansion of the retaining element a movement of the first contact position along the optical axis is generated.

10 Claims, 8 Drawing Sheets

(56) References Cited

U.S. PATENT DOCUMENTS

| | | |
|---|---|---|
| 5,177,641 A | 1/1993 | Kobayashi et al. |
| 6,040,950 A | 3/2000 | Broome |
| 7,345,832 B2 | 3/2008 | Shibuya et al. |
| 10,409,024 B2 * | 9/2019 | Piehler ............... G02B 27/0025 |
| 2016/0154203 A1 | 6/2016 | Wippermann et al. |

FOREIGN PATENT DOCUMENTS

| | | |
|---|---|---|
| JP | H1-297610 A | 11/1989 |
| WO | 2006/109587 A1 | 10/2006 |

* cited by examiner

ARRANGEMENT FOR SUPPORTING AN OPTICAL COMPONENT

CROSS-REFERENCE TO RELATED APPLICATIONS

This application is a continuation of U.S. patent application Ser. No. 15/210,471 filed Jul. 14, 2016, which claims the benefit of German Patent Application No 10 2015 11 1 375.9 filed on Jul. 14, 2015, which are incorporated by reference as if fully set forth herein.

TECHNICAL FIELD

The invention relates to an arrangement for supporting an optical component. In particular, the present invention relates to an arrangement for supporting a synthetic lens on a carrier, so that image errors of the lens within an image system that occur when the temperature changes can be compensated by a movement of the lens in the carrier which is based on the thermal expansion of the materials and which is oriented in the direction counter to the image errors.

BACKGROUND

When designing and structuring light and compact optical systems, for manufacturing purposes it is above all the stability of the image properties which is a highly essential quality criterion, alongside the adjustment precision that can be achieved. As well as sufficient mechanical stability, such systems must also be as resilient as possible against changes to the operating conditions. In particular, thermal influences when a temperature change occurs can present a challenge. Due to thermal expansion and the thermo-optical effect, the geometric and optical properties of an image system are frequently highly dependent on temperature, so that a number of corresponding countermeasures must be taken to offset them.

An additional problem is that particularly compact optical image systems are today in many cases manufactured from optical synthetic materials or polymers, such as PMMA, COC, COP or PC, due to their lower weight and the significantly reduced manufacturing costs. These materials have comparatively high thermal expansion coefficients as opposed to the conventional optical glasses used to date, and expand by around two decimal powers more when there is a temperature increase than conventional quartz glass, for example. The thermal expansion coefficient $\alpha$ of optical polymers is approximately in the range between $0.1 \cdot 10^{-4}$ $K^{-1}$ and $0.85 \cdot 10^{-4}$ $K^{-1}$ (in comparison: quartz glass 0.54 $10^{-6}$ $K^{-1}$). Furthermore, with these materials, the optical properties are strongly temperature-dependent due to the thermo-optical coefficients $\beta$, so that alongside a change in length or distance, a refractive index change to the materials must also be taken into account. It is furthermore known that with optical polymers, there is even a direct linear connection between their thermal longitudinal expansion behaviour and the thermal refractive index change to the materials that occurs (Zhang et al., Polymer 47 (2006) 4893-4896).

Synthetic lenses in particular have the property of having a high degree of influence on the focus drift of an image due to a strong refraction index change to the material when the temperature is changed. In multi-lens systems according to the prior art, the focus drift is frequently offset through the use of lenses made of synthetic material which have a positive and a negative refraction index. With simple optics with just one single lens, such as those used e.g. for the collimation of laser diodes, this is often not possible. The conventional constructive use of just one single synthetic lens is, in relation to the focus drift that occurs, not suitable for maintaining the necessary image performance (spot diameter). Compensation by frame materials with a high expansion coefficient can often also not be applied, since as a result, the space needed and the weight of the image optics usually increases considerably.

The object of the invention is thus to provide an arrangement for supporting an optical component, which can for example be a lens, a window, a mirror, a beam splitter, a wave plate, a filter or a non-linear crystal, and an optical system that comprises this arrangement, which avoids one or more of the problems of the prior art described when constructing compact optical systems, or at least considerably reduces them. In particular, an arrangement for supporting a synthetic lens on a carrier (also described as a frame or retainer) is required, in which image errors of the lens which occur when the temperature changes can be compensated within an image system without additional space requirements or an increase in weight, and in which the focus drift which is generated by a refraction index change can better be compensated than through the use of a material with a high expansion coefficient between the laser diode and the lens.

SUMMARY

The above-named object is resolved with the aid of the device according to the invention as described in claim 1.

An aspect of the invention provides an optical arrangement for supporting an optical component. This arrangement comprises an optical component with a basic body; at least one retaining element which is designed as an integral part of the optical component, or with which the optical component is actively connected, wherein the retaining element is affixed to one first contact position on the basic body; and a carrier, on which the optical component is supported by means of the retaining element, wherein the retaining element is affixed on a second contact position of the carrier. The arrangement is characterized by the fact that the retaining element is arranged in such a manner that it can be pivoted between the first contact position and the second contact position.

Here, the arrangement of an element between two contact positions is described as being able to be pivoted when the connection between these two contact positions is not rigid and inflexible, but rather is capable of adjusting itself flexibly within certain limits to a shear of the two contact positions. The term shear is used in particular to describe changes in the spatial angle relationship between the contact positions. Here, the ability to pivot can be achieved by an intrinsic property of the element itself, or can also arise for example by using a flexible affixing means as an aid. An affixing means of this nature is in particular highly viscose adhesives, since these also have sufficient flexibility when in a hardened state to retain without displacement any shear forces which occur between two adhered components and which change the angle.

The invention is based on the finding that the thermal expansion of an optical component and/or a retaining element when there is an increase in temperature transverse to the optical axis can be used to displace the lens in the direction along the optical axis. This can in particular be realised by attaching retaining elements made of synthetic material or other material with a high thermal expansion coefficient which are arranged at an angle in the outer area of the optical component. For this purpose, the retaining elements can be inserted into a carrier with a comparatively high degree of rigidity and the lowest possible thermal expansion coefficients, so that as a result, the forces arising during thermal expansion can be used to displace the optical component along the optical axis and thus to offset a temperature-dependent modulation of the refractive index. The optical component can for example be fitted into the retainer without play at a lower temperature or at the lowest specified operating temperature. When warming occurs, the retaining elements of the optical component can then bend due to the expansion of the material in such a manner that a displacement of the optical component along the optical axis is made possible. Alternatively, it is also possible that both the carrier and the retaining element are designed as components with a high degree of rigidity, whereby in this case, the retaining element is arranged both on the carrier and on the basic body of the optical component in such a manner that it can rotate.

The use of the thermal expansion of the components which occurs during operation in order to compensate for image errors requires a very specific arrangement of the individual components. With the thermal expansion of the basic body and/or a retaining element of the arrangement according to the invention, there is in effect a force flow between one first contact point on the optical component (the first point of attack of the force) and a second contact point on the carrier (the second point of attack of the force) along a shared pitch line. If this pitch line comprises an angle of less than 90° with the optical axis, this force flow can lead to a movement of the optical component along the optical axis.

In a particularly preferred embodiment of the invention, the retaining element is therefore designed in such a manner that it can be pivoted such that a thermal expansion of the basic body of the optical component in the direction of the carrier triggers a movement of the first contact position along the optical axis. Furthermore, a thermal expansion of the retaining element itself can also trigger a movement of the first contact position along the optical axis. Equally, a combination of these two embodiments can be used for a movement of the first contact position along the optical axis. Here, the basic body and the retaining element are preferably designed to be rotationally symmetric, wherein the retaining element entirely encloses the basic body. Also preferred is a square form of the basic body.

In a further preferred embodiment of the invention, it is provided that an angle between the optical axis of the optical component and a connection line which extends between the first contact position and the second contact position of the retaining element is smaller than 90°, yet larger than 70° (full circle corresponds to 360°). This preferred arrangement of the actual effective longitudinal axis of the retainer element that can be pivoted leads to a comparatively large displacement of the optical component along the optical axis with a specified thermal expansion of the optical component transverse to the optical axis. According to a further preferred embodiment of the invention, the angle is greater than 72°, preferably greater than 74°, and even more preferred, greater than 78°. Insofar as the first contact position and/or the second contact position of the retaining element comprise an expanded extension along a direction parallel to the optical axis, the above-named connecting line extends between the geometric middle points of the respective contact position (in relation to their respective expansion parallel to the optical axis).

In a preferred embodiment of the invention, it is provided that the basic body of the optical component comprises an optically transparent synthetic material. Here in particular, poly(methyl acrylates) (PMMA), polycarbonates (PC), cycloolefin-copolymers (COC), cycloolefin-polymers (COP), polystyrols (PS), styrol-acrylonitrile-copolymers (SAN), polyetherimides (PEI), poly-(ether)-sulfones (PES/PSU), acrylonitrile-butadiene-styrol-copolymers (ABS), styrene-acrylonitriles (SAN), polymethacrylomethylimides (PMMI), silicones and cast resins (CR 39) are preferred as possible materials. A certain material is here described as being optically transparent when an optical component which is produced from it comprises in a desired wavelength range (preferably in the visible spectral range between 380 nm and 780 nm, and in the spectral ranges of the UV, NIR and VIR and in any combination of these) a sufficiently high transmission capability (preferably over 0.5, preferably over 0.75, preferably over 0.9, preferably over 0.95) and sufficient homogeneity, i.e. in relation to the typical length scales in the range of the operating wavelengths a constant spatial distribution of the refractive index with maximum index gaps, preferably less than $10^{-3}$, particularly preferably less than $10^{-5}$, for use in an optical image system.

In a further preferred embodiment of the invention, it is provided that the retaining element is formed from a flexible material, and wherein the retaining element can intrinsically be deformed and pivoted. In particular, the flexible material can be a spring element, such as a spring sheet or a flexible rubber. Furthermore, the retaining element can also be designed using one or more spiral springs or other flexible damping elements. The spring element should make it possible to generate a resilience in the spring element through a thermal expansion of the basic body of the optical component and/or of the retaining element, so that it counteracts the movement of the first contact position along the optical axis caused by the thermal expansion of the basic body and/or of the retaining element. With a corresponding design of the strength of the spring element in relation to a force which causes the movement of the first contact position along the optical axis, the spring element can also certainly still comprise a certain pre-tension, even at the lowest specified operating temperature, so that as a result, a high mechanical stability of the entire optical arrangement can at the same time be achieved by means of the additional contact pressure which occurs.

In a further preferred embodiment of the invention, it is provided that the carrier consists of a material the length expansion coefficient of which is less than that of the material of which the basic body of the optical component and/or the retaining element consists. Furthermore, it is provided in a preferred embodiment of the invention that the carrier consists of a material the rigidity of which (in particular the lateral and bending resistance of which) is greater than that of the material of which the basic body of the optical component and/or the retaining element consists. For these two embodiments, the carrier can however also comprise further materials with other material properties. For an implementation of the above-named embodiments according to the invention, the overall behaviour of the composite carrier material is then decisive with regard to its rigidity and its length expansion coefficient in relation to the material of the basic body of the optical component and/or of the retaining element. With the above-named embodiments, this is achieved by means of the fact that the carrier remains essentially dimensionally stable in relation to the thermally changing components of the retaining device, and that elements which connect to it such as an additional laser diode or other optical components are largely uninfluenced by the compensation according to the invention of the image errors which occur. Particularly preferred here are ratios between the length expansion coefficients of the material of the carrier in relation to the material of the basic body of the optical component and/or of the retaining element of <1, <0.5, <0.1, <0.01 and <0.001, and between the lateral or bending resistances in correspondingly reverse ratios.

In a further preferred embodiment of the invention, it is provided that the retaining element is affixed by an affixing means with high viscosity on the carrier and/or on the basic body of the optical component in such a manner that it can be pivoted. Here, according to the definition named above in the description, in such a manner that it can be pivoted means in particular the ability to be able to adapt to a change in the spatial angle relationship that arises between the first and second contact position. What is meant by fixation by an affixing means is that a firm but flexible connection exists between the respective components, which is able to transmit both traction and propulsive forces between the components. In particular, such affixing means can be a flexible adhesive such as those based on latex or silicone. A high degree of viscosity of the affixing means should accordingly be interpreted such that the connection thus obtained has a clearly reduced degree of rigidity compared to the components connected to it.

In a further preferred embodiment of the invention, it is provided that retaining elements (the first and second retaining element) are located on two opposite sides of the optical component, and that these retaining elements generate a shared plane together with the optical axis. When special requirements arise with regard to the height of an optical system, this retention on two sides of the optical component serves the purpose of being able to reduce the spatial requirements of the retaining device to a minimum in certain spatial angle ranges, and thus a structural height which is comparable to conventional retaining systems for optical components can be secured, at least in sections.

In a further preferred embodiment of the invention, it is provided that a first angle between the first contact positions of the two retaining elements and a connection line that extends between the first contact position and the second contact position of the first retaining element is larger than 0°, while being less than 20° (this corresponds to an angle between the optical axis of the optical component and a connection line which extends between the first contact position and the second contact position of the first retaining element which is greater than 70° and less than 90°). In a further preferred embodiment of the invention, it is provided that a second angle between the connection line between the first contact positions of the two retaining elements and a connection line that extends between the first contact position and the second contact position of the second retaining element is also larger than 0° while being smaller than 20° (this corresponds to an angle between the optical axis of the optical component and a connection line which extends between the first contact position and the second contact position of the second retaining element which is greater than 70° and less than 90°). This preferred arrangement of the actually effective longitudinal axes of the retaining elements that can be pivoted leads to a comparatively high degree of displacement of the optical component along the optical axis with a specified thermal expansion of the optical component transverse to the optical axis. According to a further preferred embodiment of the invention, the first angle and the second angle are less than 18°, more preferred less than 16°, even more preferred less than 14° and even more preferred less than 12° (this corresponds to an angle between the optical axis of the optical component and a connection line which extends between the first contact position and the second contact position of the respective retaining element which is greater than 72° and less than 90°, preferably greater than 74° and less than 90°, more preferred greater than 76° and less than 90° and more preferred greater than 78° and less than 90°).

According to an aspect of the present invention an optical arrangement is disclosed, comprising: an optical component with a basic body; at least one retaining element, which is designed as an integral element of the optical component or is actively connected to the optical component, wherein a first end of the retaining element, which faces towards the optical component, is affixed on a first contact position of the basic body; and a carrier, on which the optical component is supported by means of the retaining element, wherein a second end of the retaining element, which faces away from the optical component, is affixed to a second contact position of the carrier; wherein the retaining element is arranged in such a manner that it can be pivoted between the first contact position and the second contact position, wherein the second contact position of the carrier comprises a groove, the groove having a bottom surface and a side surface, wherein the second end of the retaining element engages the groove, wherein the second end of the retaining element contacts the bottom surface of the groove, and a side portion of the retaining element contacts the side surface of the groove.

According to embodiments of the present invention, the retaining element has a longish shape. According to embodiments, the optical arrangement may consist of two retaining elements. The retaining elements may be arranged opposite to each other with respect to the optical component.

The (each) retaining element may have at least a first planar side surface. The (each) retaining element may have a second planar side surface. The first planar side surface and the second planar side surface may be parallel to each other. The first planar side surface may directly contact a first side surface of the groove (of the carrier). The second planar side surface may directly contact a second side surface of the groove (of the carrier). The (each) retaining element may have a (second) planar end surface. The planar end surface of the (second end of the) retaining element may directly contact the bottom surface of the groove. The complete planar end surface of the (second end of the) retaining element may directly contact the bottom surface of the groove. The (each) retaining element may have a uniform width from the first end to the second end. The groove may be integrally formed in carrier. The carrier may comprise a (substantially) planar surface in the portion where the groove is formed.

The basic body may comprise an optically transparent synthetic material. The optical arrangement may comprise an optical axis. The retaining element may be designed to be pivoted in such a manner that a thermal expansion of the basic body in the direction of the carrier generates a movement of the first contact position along the optical axis. The retaining element may be designed to be pivoted in such a manner that a thermal expansion of the retaining element generates a movement of the first contact position along the optical axis. The retaining element may be designed from a flexible material. The retaining element may intrinsically be deformed and pivoted. A return force may be generated in a spring element (due to a thermal expansion of the basic body and/or of the retaining element), which may counteract a movement of the first contact position along the optical axis caused by the thermal expansion of the basic body and/or of the retaining element.

The carrier may consist of a material the longitudinal expansion coefficient of which is less than that of the material of which the basic body of the optical component and/or the retaining element consists (is formed). The carrier may consist of a material the rigidity of which is greater than that of the material of which the basic body of the optical component and/or the retaining element consists (is formed). The retaining element may be affixed by an affixing means with high viscosity to the carrier and/or the basic body of the optical component in such a manner that it can be pivoted. Retaining elements may be located on two opposite sides of the optical component and these retaining elements may develop a shared plane together with the optical axis.

In the sense of the present invention, the expression "optical arrangement" may also be understood as an optical device. Further, the expression "optical component" may also be understood as an optical element. Further, the expression "basic body" may also be understood as a main body. Further, the expression "retaining element" may also be understood as a holding element. Further, the expression "actively connected to the optical component" may also be understood as being in communication with the optical component (or optical element). Further, the expression "carrier" may also be understood as a support.

Further preferred embodiments of the invention are derived from the features described in the remaining dependent claims. Here, the different embodiments of the invention described in this application can advantageously be combined with each other, unless otherwise stated in individual cases.

BRIEF DESCRIPTION OF THE DRAWINGS

The invention will now be explained below in exemplary embodiments with reference to the associated drawings, in which.

DETAILED DESCRIPTION

Figure 1:
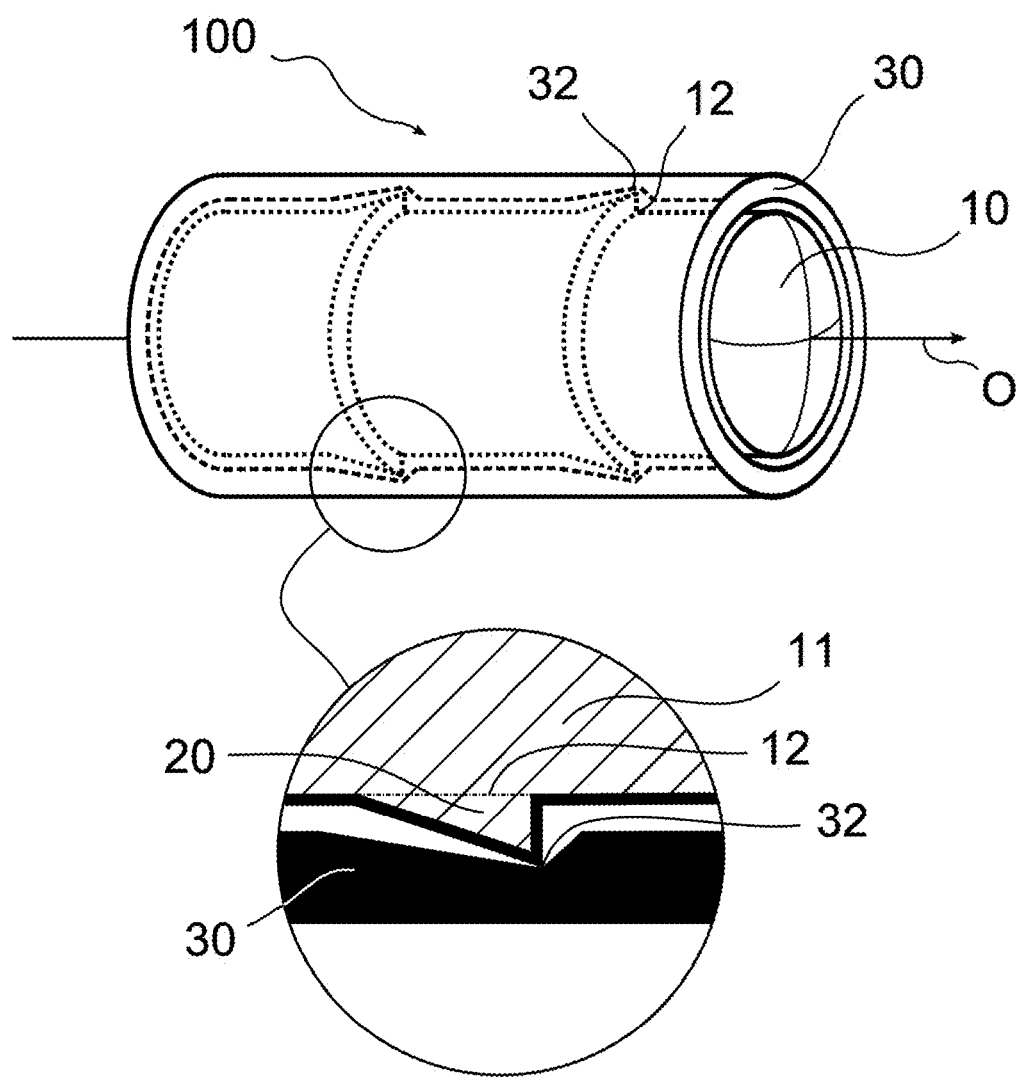
FIG. 1 shows a spatial-schematic depiction of an overall view of an optical arrangement according to the invention and as a profile view of a partial depiction.

FIG. 1 shows a spatial-schematic depiction of an optical arrangement 100 according to the invention as an overall view and as a partial depiction in profile. The optical component 10 shown as an example is a so-called rod lens (such as a gradient index lens) with a basic body 11 and an optical axis O which runs through the basic body 11. The basic body 11 of the optical component 10 is rotationally symmetrically enclosed by two ring-shaped retaining elements 20. These retaining elements 20 are designed as an integral part of the optical component 10 and are in each case affixed to a first contact position 12 on the basic body 11. As can be seen from the partial depiction, the outer form of the retaining elements 20 can correspond to a triangle in profile, on which the contact position 12 is located along a side edge of the triangle. The present invention is however not limited to triangular retaining elements 20, but the retaining elements 20 can have any form required.

The basic body 11 with the integral retaining elements 20 is surrounding by a carrier 30 which is developed as a hollow cylinder with an inner diameter which matches the outer diameter of the optical component 10. This carrier 30 protects the optical component 10 from external influences and can among other things be used for coupling and affixing to further external optical components. For this purpose, the carrier 30 is produced from a solid, dimensionally stable material with the lowest possible thermal expansion coefficient. Here, according to the invention, the longitudinal expansion coefficient of the material from which the carrier 30 is constructed is considerably lower than the longitudinal expansion coefficient of the material from which the basic body 11 and the integral retaining elements 20 are constructed. Within the carrier 30 the basic body 11 is supported free of play by means of the integral retaining elements 20. For this purpose, ring-shaped recesses are located within the carrier 30 into which the retaining elements 20 can grip, and as a result affix the optical component 10 in each case along a circular second contact position 32 on the carrier 30. In the partial depiction, it can be seen that the recesses in the profile of the carrier 30 are also triangular in shape. In order to leave the retaining elements 20 sufficient free space during a thermal expansion, this sectional triangle on the second contact position 32 has an obtuse angle of greater than 90°. It is characteristic of the optical arrangement 100 shown that an affixation of the optical component 10 via circular (or in the partial depiction, punctual) second contact position 32 is achieved via the outer form of the retaining elements 20 and the recesses of the carrier 30. These fixation points also remain largely intact during a thermal expansion of the individual components, and thus enable a potential pivoting behaviour of the retaining elements 20 around these structurally solid second contact positions 32 which do not change location.

Figure 2:
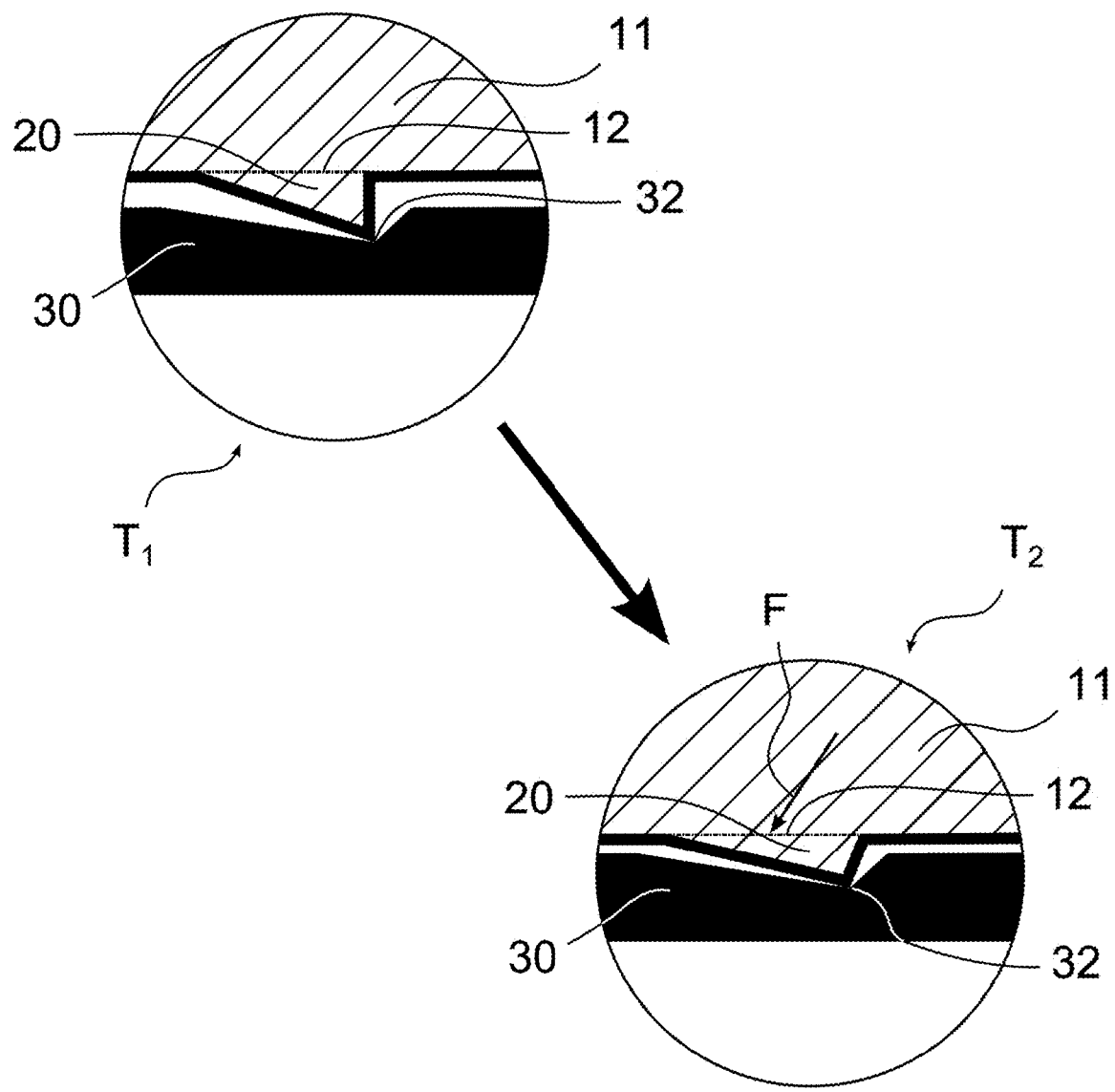
FIG. 2 shows a schematic depiction of the method of functioning of an optical arrangement according to the invention according to the partial depiction shown in FIG. 1.

FIG. 2 shows a schematic depiction of the method of functioning of an optical arrangement 100 according to the invention as shown in the partial depiction in FIG. 1. In a first state with a temperature $T_1$ the depiction corresponds to the partial depiction of a profile shown in FIG. 1 in the area of the retaining elements 20. With an increase in temperature of the optical arrangement 100 from $T_1$ to $T_2$ a thermal expansion of the basic body 11 and the retaining elements 20 occurs, in which alongside pure distance changes in relation to further external optical components, the related changes in the imaging properties of the optical component 10 can in particular also become noticeable in a negative way. For optical components 10 in particular which are made of synthetic materials, due to their relatively high thermal expansion coefficients, a more or less isotropic increase in the outer dimensions of the components can be anticipated. If this expansion movement is captured in certain directions by fixed-location contact positions, however, there is instead a partial increase in the inner tensions of the material. In particular, the second contact positions 32 of the carrier 30 are precisely such fixed contact positions in an optical arrangement 100 according to FIG. 1. With a thermal expansion of the optical arrangement 100, the second contact positions 32, due to preferred maximally differing selected thermal expansion coefficients of the carrier 30 and the basic body 11 with the integral retaining elements 20, are almost in a fixed location. Therefore, an expansion of the basic body 11 with the integral retaining elements 20 preferably occurs around these positions. With an arrangement according to FIG. 1, a resulting force F here emerges which is directed towards the carrier 30 and which comprises a component along the optical axis O. Accordingly, a second state emerges in FIG. 2 with a temperature $T_2 > T_1$, in which the basic body 11 with the integral retaining elements 20 has thermally expanded in the direction of the carrier 30 and additionally, a movement of the first contact position 12 takes place along the optical axis O. The pivoting of the retaining elements 20 around the second contact position 32 of the carrier 30 can be detected particularly by means of the altered position of the first contact position 12. As a result, a change occurs in the angle between the first contact position 12 and the second contact position 32 in relation to the almost fixed-location carrier 30.

Figure 3A:
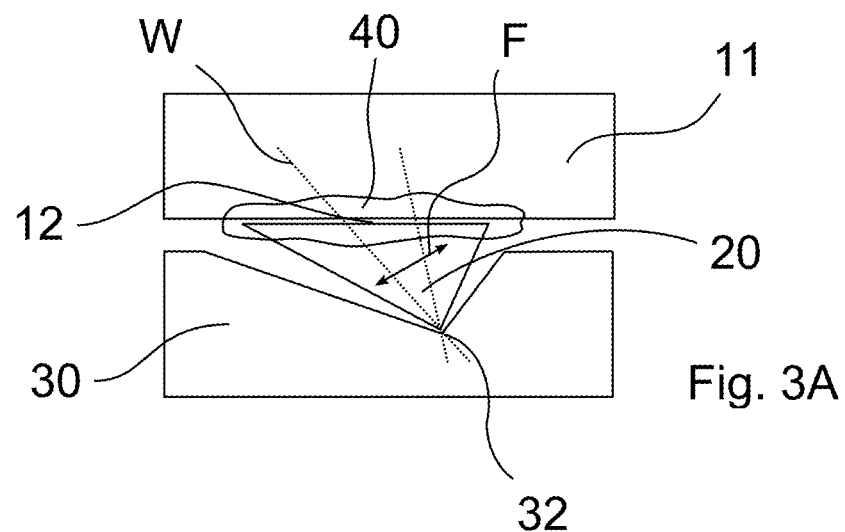
FIG. 3A shows a schematic view of a further preferred embodiment of an optical arrangement according to the invention according to a partial depiction shown in FIG. 1.

FIG. 3A shows a schematic depiction of a further preferred embodiment of an optical arrangement 100 according to the invention according to a partial depiction shown in FIG. 1. The fundamental structure of the retaining element 20 shown largely corresponds to the structure of the preceding exemplary embodiment. Here, too, the retaining element 20 is affixed in the carrier 30 on the second contact position 32. In contrast to the preceding embodiments, the retaining element 20 is here not designed as an integral element of the optical component 10, however, but is actively connected as an independent retaining element with the optical component with the aid of a suitable affixing means 40 (preferably a flexible adhesive with high viscosity $\eta > 10^6$, particularly preferred $\eta > 10^{10}$, and a low shore A hardness<85, particularly preferred, a shore A hardness<50) along the first contact position 12. Here the retaining element 20 can be made of the same material as the optical element 10 (preferably synthetic material), or can be formed from any other material. In particular, this material can have different thermal expansion coefficients compared to the materials used for the carrier 30 and the basic body 11 of the optical component 12. By adapting and coordinating the individual materials to each other accordingly, a precisely coordinated thermal behaviour of the entire optical arrangement 100 can be set in addition to the degrees of freedom given by the special formation of the individual retaining elements 20. In particular, through increasing or reducing the thermal expansion of the retaining elements 20 in relation to the thermal expansion of the optical component 10, the movement of the first contact position 12 along the optical axis O, and thus of the optical component 10 in itself, can be controlled. The force F resulting from the expansion or shrinking of the basic body 11 and the retaining elements 20 is also drawn in. The force components which occur in the direction of the optical axis (not drawn in here, but corresponding to the one which can be assigned to FIG. 1) are here directly visible. The figure further shows with broken contours the pitch lines W of the force flow at maximum and minimum operating temperature, i.e. at minimum and maximum thermal expansion of the arrangement. The pivot movement of the retaining element 20 according to the invention around the second contact position 32 which is here in a fixed location can be seen here.

Figure 3B:
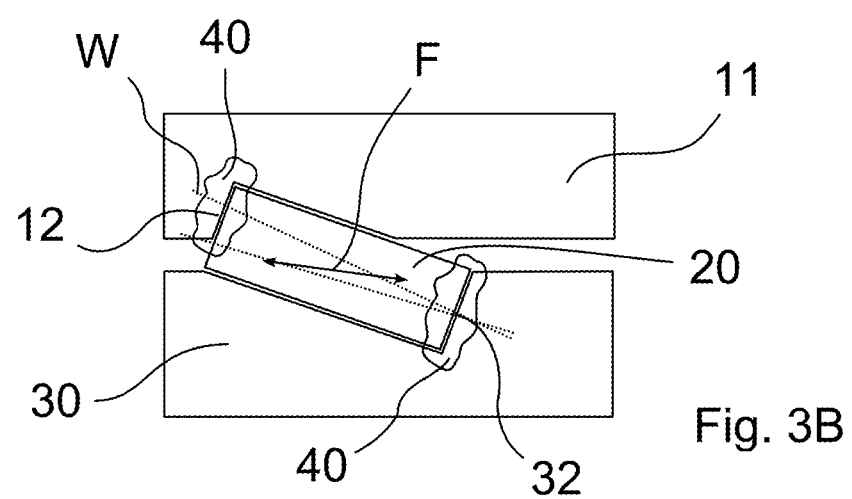
FIGS. 3B, and 3C show schematic depictions of further preferred embodiments of an optical arrangement according to the invention as a partial depiction in profile.
Figure 3C:
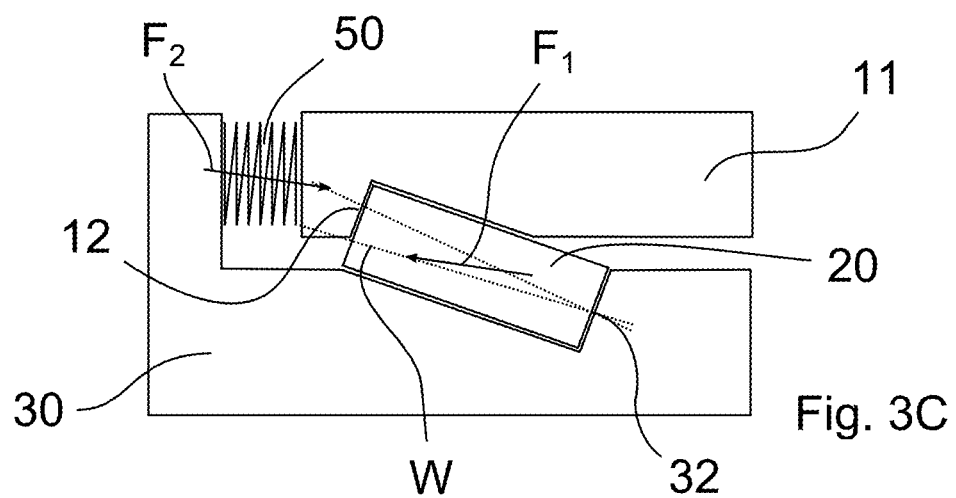

FIGS. 3B and 3C show schematic depictions of further preferred embodiments of an optical arrangement 100 according to the invention in a partial depiction in profile. In FIG. 3B, the retaining element 20 is also designed as an independent component, which is here shown without loss of generality in the abstract form of a rectangle. A first contact position 12 is located within a recess of the basic body 11 of the optical component 10 in the form of a triangle. This recess is located opposite a further recess in the carrier 30, within which a second contact position 32 is located. Between these two contact positions, the rectangular retaining element 20 is located, wherein the short sides of this rectangle are connected firmly to each other via a suitable affixing means. For the selection of the individual materials, the description relating to FIG. 3A applies accordingly. The retaining element 20 shown is able due to affixation on both sides to transmit both torsion and compression forces between the basic body 11 and the carrier 30. In particular, in this exemplary embodiment, a material can be selected for the retaining elements 20 which has a very high thermal expansion coefficient, so that this can take on the function of a thermally driven linear adjuster. In particular, here, ratios between the longitudinal expansion coefficient of the material of the carrier 30 and the material of the retaining element 20 of <1, <0.5, <0.1, <0.01 and <0.001 are particularly preferred. With its expansion or shrinking, a resulting force F then acts along the longitudinal axis of the retaining elements 20, wherein in this example, effectively a tipping of the pitch lines W shown arises at different operating temperatures and thus a pivoting of the retaining element 20 around the almost fixed-location second contact position 32. This tipping is caused above all by the fact that an expansion of the retaining element 20 in the direction vertical to the carrier 30 is restricted by the basic body 11 and the carrier 30, and thus an expansion preferably occurs in the direction of the optical axis. The embodiment in FIG. 3C shows an arrangement of the components which is comparable in its essential features. The retaining element 20 is here not connected via an affixing means 40 to the basic body 11 or the carrier 30, however, which is why when the retaining element 20 expands, only compression forces are transmitted in one direction, preferably in a direction vertical to the carrier 30. An additional spring element 50 serves as a corresponding return element, which is located between the basic body 11 and the carrier 30, wherein a force $F_2$ generated by the spring element 50 acts counter to the movement of the first contact position 12 along the optical axis O which is generated by the thermal expansion. In this exemplary embodiment, too, in a similar manner to the embodiment shown in FIG. 3B, when there is a change in temperature there is a tipping of the pitch lines W at different operating temperatures around the second contact position 32. When the basic body 11 or the retaining elements 20 expand, a force $F_1$ acts along a pitch line W which penetrates the second contact position 32, and when the above-named components shrink, a corresponding return force $F_2$ acts via the spring element 50, preferably in the direction of the optical axis O. The tipping of the force $F_2$ in relation to the axis of the spring element 50 as drawn into the depiction results here from constraining forces which are not drawn in. In the present exemplary embodiments, the retaining elements 20 have been shown as rectangles and the recesses on the basic body 11 and the carrier 30 have been adapted accordingly with regard to their shape. However, this is not a restriction of the generality of the implementation according to the invention; to a far greater extent, the retaining elements 20 and the corresponding recesses can also be realized in a different suitable form.

Figure 4:
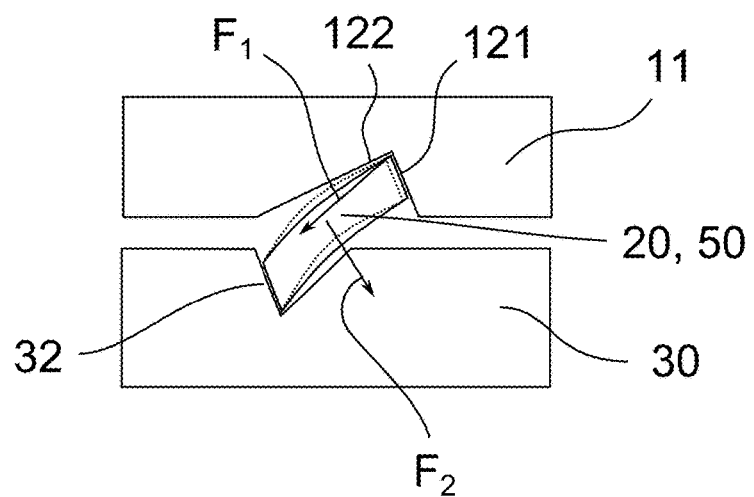
FIG. 4 shows a schematic depiction of a preferred embodiment of an optical arrangement according to the invention with an integral spring element as a partial depiction in profile.

FIG. 4 shows a schematic depiction of a preferred embodiment of an optical arrangement 100 according to the invention with an integral spring element 50 as a partial depiction in profile. In particular, this embodiment is a combination of the embodiments disclosed in FIGS. 3B and 3C. The particular feature of this embodiment is that the retaining element 20 acts as a linear adjustment element in accordance with the description relating to FIG. 3B, while at the same time also functioning as the return spring element 50 of an embodiment as shown in FIG. 3C. The retaining element 20 should for this purpose preferably consist of a highly flexible, strongly elastic material with a relatively high thermal expansion coefficient. Here, in particular, thermal expansion coefficients are preferred in the range between $1 \cdot 10^{-3}$ $K^{-1}$ and $1 \cdot 10^{-4}$ $K^{-1}$ and spring rates between $10^2$ $N \cdot m^{-1}$ and $10^6$ $N \cdot m^{-1}$. When there is a temperature increase, a material of this nature will expand strongly, but will be partially prevented from doing so by the basic body 11 which lies on top of it along a first section 121 of the first contact position 12. As a result, the retaining element 20 is bent, which causes an intrinsic spring tension to be built up. Taking into account an expansion of the basic body 11 which also occurs, this effectively leads to a shortening of the retaining element 20 along one of its longitudinal axes, so that via a second section 122 of the first contact position 12, as well as the spring tension, a movement of the first contact position 12 is also generated along the optical axis, comprising a first section 121 of the first contact position 12 and a second section 122 of the first contact position 12. Due to the different directions of the acting forces, during the expansion of the individual materials, several sections 121, 122 for the first contact position 12 should be taken into account. In this exemplary embodiment, the forces acting in the retaining element 20 during expansion ($F_1$) and shrinking ($F_2$) of the basic body 11 and the retaining element 20 are also drawn in. With this embodiment, the tensions arising in the retaining element 20 are thus directly used to generate a return force. This embodiment of a directly sprung optical arrangement 100 to support an optical component 10 can therefore also be implemented with retaining elements 20 which have been designed as an integral element of the optical component 10 (corresponding lenses are also described as wing or butterfly lenses).

Figures 5A, 5B:
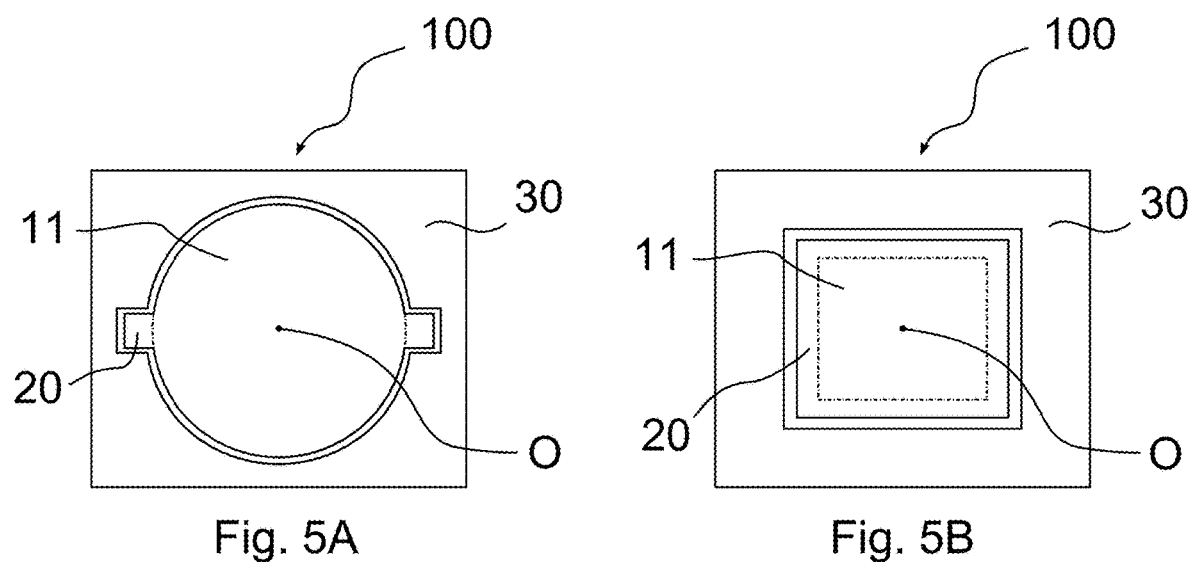
FIGS. 5A, and 5B show schematic depictions of the profile of further particularly preferred embodiments of the carrier of an optical arrangement according to the invention.

FIGS. 5A and 5B show different schematic depictions of the profile of preferred embodiments of the carrier 30 of an optical arrangement 100 according to the invention. Here, without loss of generality, different alternative embodiments of the spatial-schematic depiction drawn in FIG. 1 are shown with a view in the direction of the optical axis O. The basic body 11 of the component shown in FIG. 5A shows a circular profile, wherein the component is supported by means of integral retaining elements 20 in a carrier 30 with a square profile. In contrast to the exemplary embodiment shown in FIG. 1, the retaining element 20 here does not enclose the entire basic body 1 in a ring, but is preferably only localized along one or a small number of supporting axes for space-saving purposes. With the exemplary embodiment shown, a single-axis arrangement of the retaining elements 20 in particular is provided on two opposite sides of the basic body 11, wherein these retaining elements develop a shared plane together with the optical axis O. In FIG. 5B, as in the exemplary embodiment according to FIG. 1, a basic body 11 is shown with a circumferential integral retaining element 20 in a square form for illustrative purposes.

Figure 6:
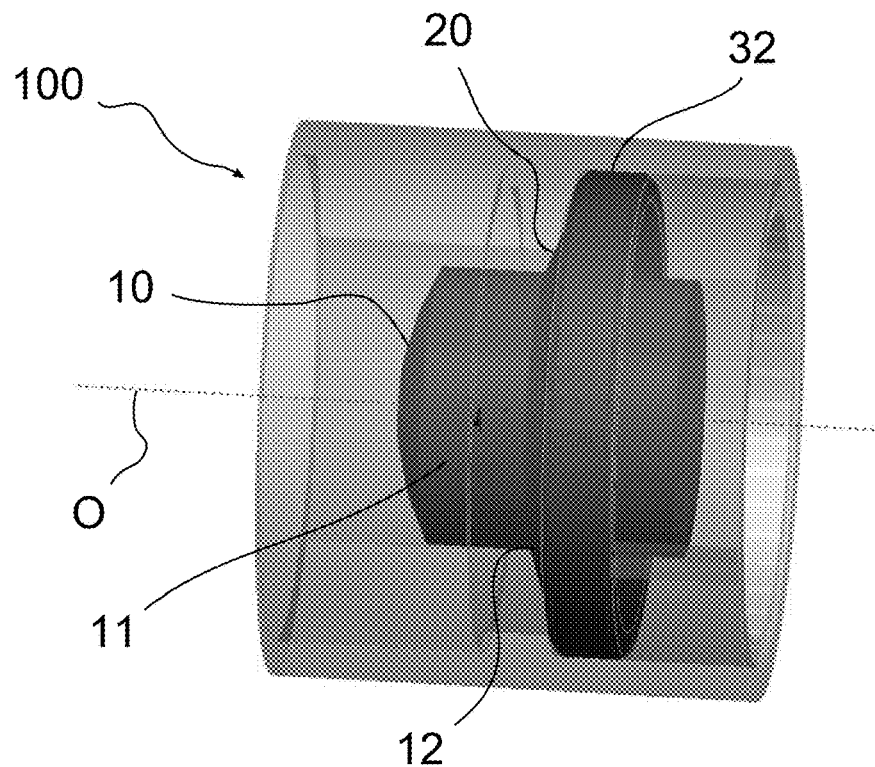
FIG. 6 shows a spatial-schematic depiction of a real embodiment of an optical arrangement according to the invention oriented to FIG. 1 in an overall view and as a profile depiction.
Figure 6:
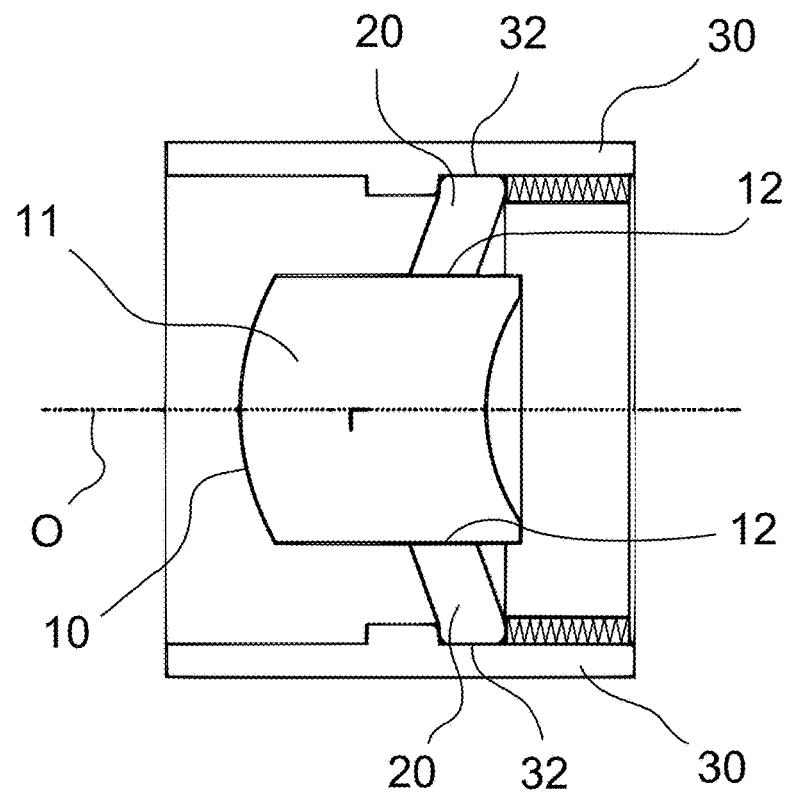

FIG. 6 shows a spatial-schematic depiction of a real embodiment of an optical arrangement 100 according to the invention based on FIG. 1 as an overall view and as a profile depiction. The optical component 10 shown is a cylindrical lens with a basic body 11 and an optical axis O which runs through the basic body 11. The basic body 11 of the optical component 10 is enclosed in a rotationally symmetric manner by a ring-shaped retaining element 20. This retaining element 20 is designed as an integral part of the optical component 10 and is affixed respectively to a first contact position 12 on the basic body 11. As can be seen from the profile depiction, the outer form of the retaining elements 20 essentially corresponds to a parallelogram, on which the second contact position 32 is located opposite the first contact position 12. The basic body 11 with the integral retaining element 20 is surrounded by a carrier 30 which is developed as a hollow cylinder with an inner diameter which matches the outer diameter of the optical component 10. The angle between the longitudinal axes of the retaining elements 20 and the optical axis O is less than 90°, but greater than 70°, as a result of which thermal warming of the optical component 10 (basic body 11) leads to a comparatively large displacement along the optical axis O.

Figure 7:
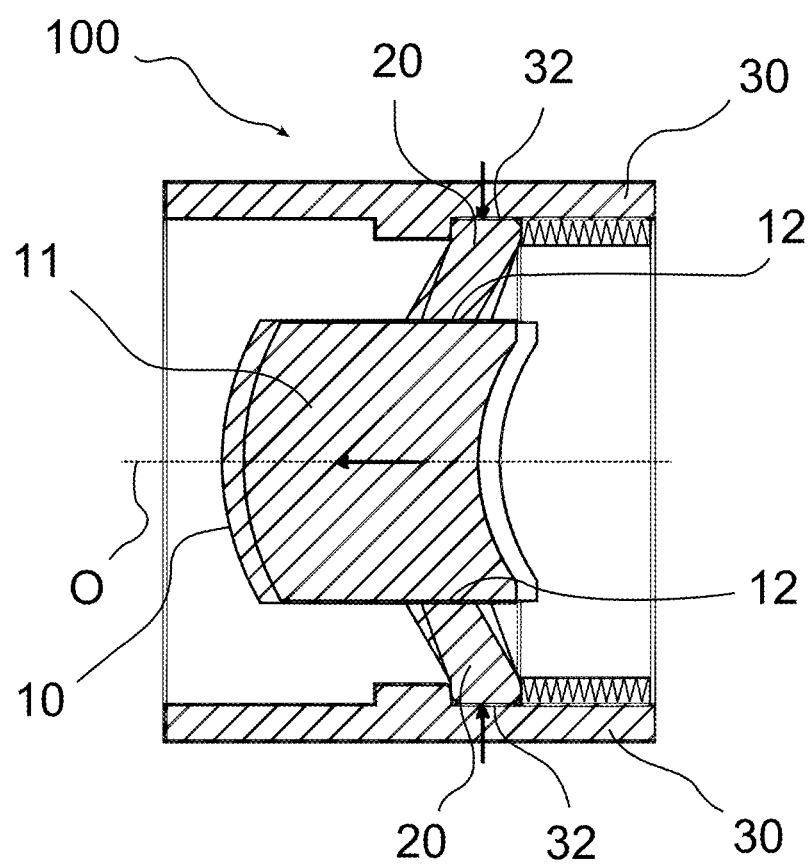
FIG. 7 shows a schematic depiction of the method of functioning of an optical arrangement according to the invention in accordance with the depiction in FIG. 6.

FIG. 7 shows a schematic depiction of the method of functioning of an optical arrangement 100 according to the invention according to the depiction shown in FIG. 6. The content of this depiction essentially corresponds to the items shown in FIG. 2. The retaining element has an alternative form, but the principle method of functioning of the entire optical arrangement 100 is however not influenced as a result and applies accordingly. In the image, the shaded areas represent the deformation of the individual assemblies, which are caused by an increase in the temperature. Here, there is a thermal expansion in particular of the basic body 11 and the retaining element 20. With the second contact position 32, the exemplary embodiment shown here is an expanded contact surface with several areas, which is strongly restricted in a possible expansion by the frame 30. With a corresponding increase in temperature, a thermal expansion thus occurs, mainly in the direction of the contact position 12. Due to the parallelogram-type form of the retaining element 20 and its tensioning in the frame 30, a direction is defined in such a manner that a movement according to the invention of the first contact position 12 along the optical axis O and thus a pivoting of the retaining element 20 between the first contact position 12 and the second contact position 32 is generated. The angle between the longitudinal axes of the retaining elements 20 and the optical axis O is less than 90° but greater than 70°, as a result of which a thermal warming of the optical component 10 (basic body 11) leads to a comparatively large displacement along the optical axis O.

Figure 8:
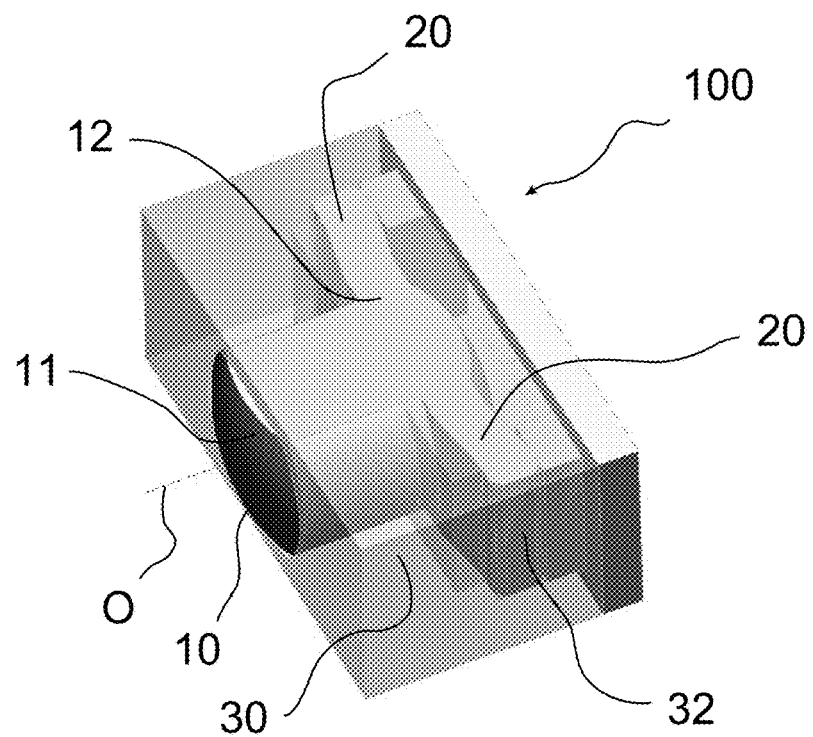
FIG. 8 shows a spatial-schematic depiction of a preferred real embodiment of an optical arrangement according to the invention oriented to FIG. 5A in an overall view and as a profile view.
Figure 8:
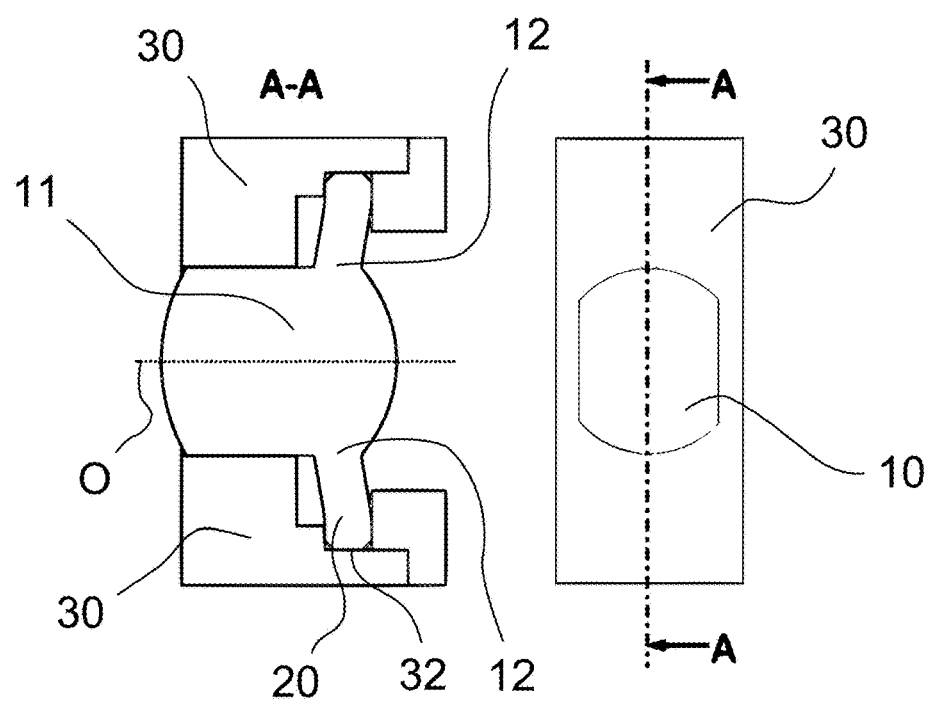

FIG. 8 shows a spatial-schematic depiction of a preferred real embodiment of an optical arrangement 100 according to the invention oriented to FIG. 5A in an overall view and as a profile depiction. This embodiment serves in particular to realize as flat a construction as possible in cases where there are special requirements regarding the height of the optics used. A thick lens is shown with which the integral retaining elements 20 used are located on two opposite sides of the basic body 11 of the optical component 10 and these retaining elements 20 together with the optical axis O develop a shared plane. To further flatten the structure, in addition to the embodiment shown in FIGS. 5A-5B, the outer section of the basic body 11 is also restricted with regard to its height, so that the optical component 10 also no longer has a rotationally symmetric profile. As can be seen from the corresponding profile depiction, the fundamental form of the retaining elements 20 does however essentially correspond to a form as shown in FIG. 6. For this reason, the description of the method of functioning applies accordingly and can be directly taken from the description relating to FIG. 7. The angle between the longitudinal axes of the retaining elements 20 and the optical axis O is less than 90°, but greater than 70°, as a result of which a thermal warming of the optical component 10 (basic body 11) leads to a comparatively large displacement along the optical axis O.

Figure 9:
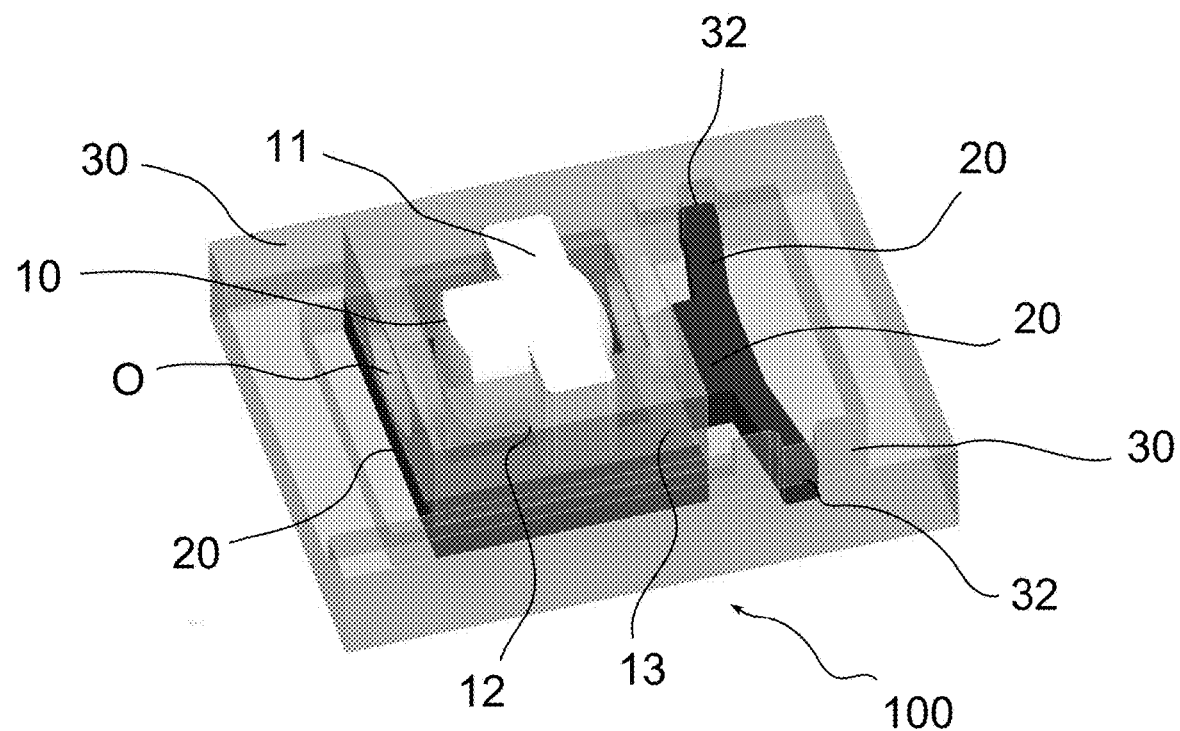
FIG. 9 shows a spatial-schematic depiction of a further preferred real embodiment of an optical arrangement according to the invention oriented to FIG. 5A in an overall view and as a profile view.
Figure 9:
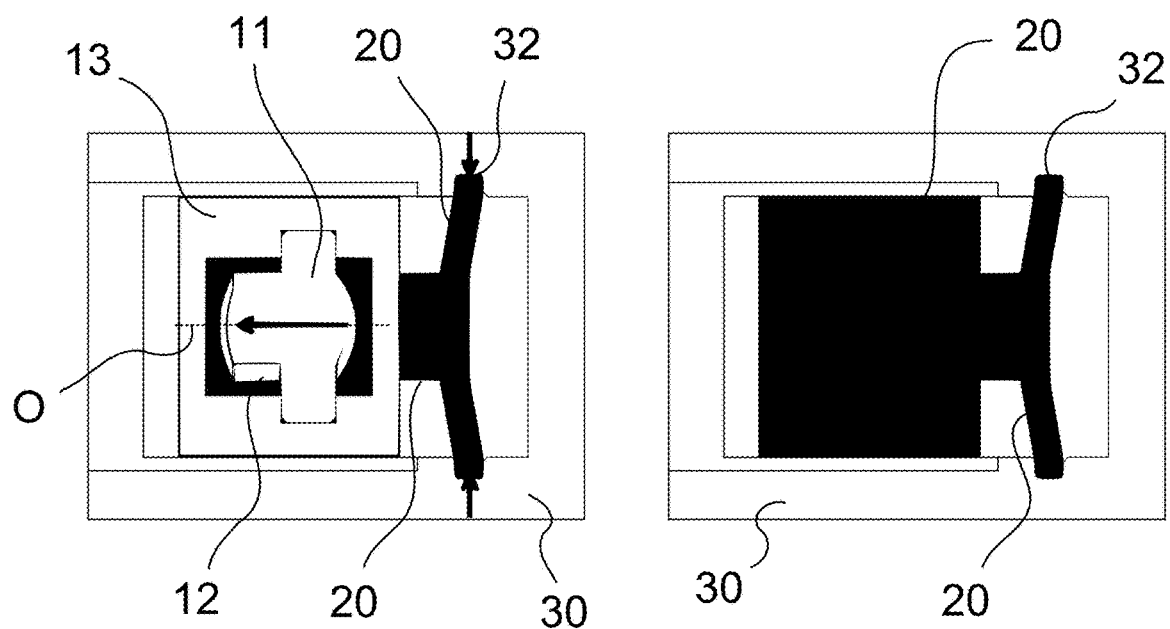

FIG. 9 shows a spatial-schematic view of a further preferred real embodiment of an optical arrangement 100 according to the invention based on FIG. 5A in an overall view and as a profile depiction. With this embodiment, the intention is also to realize as flat a construction as possible, wherein the retaining element 20 is here not formed as an integral element of the optical component, however, but according to the invention is simply directly actively connected to the optical component 10. With the embodiment shown, the basic body 11 of the optical component 10 lies flat on a first contact position 12 on a part of the retaining element 20. This retaining element 20 further comprises corresponding second contact positions 32 on a carrier 30. The form of the retaining element 20 corresponds essentially to a form shown in FIG. 8 in the area around the second contact positions 32, and for this reason, a thermal expansion of the retaining element here also, according to the invention, causes a corresponding movement of the first contact position 12 along the optical axis O and thus a pivoting of the retaining element 20 between the first contact position 12 and the second contact position 32. Due to the movement of the first contact position 12, in the exemplary embodiment, there is also a corresponding directed movement of the basic body 11 of the optical component 10. The optical component 10 is here surrounded for example by an additional frame 13 for increased stability. The frame 13 is purely optional and has no influence over the function according to the invention of the invention. However, there is certainly a possibility in a further embodiment variant of also selecting an embodiment that corresponds to FIG. 9, with flexible elements as a retainer, instead of the connection, regarded as being rigid, between the optical component 10 and the frame 13. With the aid of such an interlocking two-stage optical arrangement, larger adjustment travel for a movement of the optical component 10 in the direction of the optical axis O can be achieved. Such an embodiment results from the direct multiple application of the idea according to the invention. The angle between the longitudinal axes of the fingers of the retaining elements 20 and the optical axis O is less than 90°, but larger than 70°, as a result of which a thermal warming of the optical component 10 (basic body 11) leads to a comparatively high degree of displacement along the optical axis O.

LIST OF REFERENCE NUMERALS

10 Optical component
11 Basic body
12 First contact position
13 Frame
121 First section of the first contact position
122 Second section of the first contact position
20 Retaining element
30 Carrier
32 Second contact position
40 Affixing means
50 Spring element
100 Optical arrangement
$T_1$ First temperature
$T_2$ Second temperature
O Optical axis
F Force
$F_1$ First force
$F_2$ Second force
W Pitch line

What is claimed is:

1. An optical arrangement comprising:
a lens with a basic body;
at least one retaining element, which is designed as an integral element of the lens or is directly contacting the lens, wherein a first end of the retaining element, which faces towards the lens, is affixed on a first contact position of the basic body; and
a carrier, on which the lens is supported by means of the retaining element, wherein a second end of the retaining element, which faces away from the lens, is affixed on a second contact position of the carrier;
wherein the retaining element is arranged in such a manner that it can be pivoted between the first contact position and the second contact position, leading to displacement of the lens along an optical axis,
wherein due to a thermal expansion of at least one of the basic body or of the retaining element a return force is generated in a spring element, which counteracts a movement of the first contact position along the optical axis caused by the thermal expansion of the at least one of the basic body or of the retaining element,
wherein the second contact position of the carrier comprises a groove, the groove having a bottom surface and a side surface, wherein the second end of the retaining element engages the groove,
wherein the second end of the retaining element contacts the bottom surface of the groove, and a side portion of the retaining element contacts the side surface of the groove, and
wherein the pivoting arrangement of the retaining element creates an angle between a connecting line extending between the first contact position and the second contact position, and the optical axis of the lens is lower than 90° and greater than 70°.

2. The optical arrangement of claim 1, wherein the basic body comprises an optically transparent synthetic material.

3. The optical arrangement of claim 1, wherein the optical arrangement comprises an optical axis and the retaining element is designed to be pivoted in such a manner that a thermal expansion of the basic body in the direction of the carrier generates a movement of the first contact position along the optical axis.

4. The optical arrangement of claim 1, wherein the retaining element is designed to be pivoted in such a manner that a thermal expansion of the retaining element generates a movement of the first contact position along the optical axis.

5. The optical arrangement of claim 1, wherein the retaining element is designed from a flexible material, and wherein the retaining element can intrinsically be deformed and pivoted.

6. The optical arrangement of claim 1, wherein the carrier consists of a material the longitudinal expansion coefficient of which is less than that of the material of which the basic body of the lens and/or the retaining element consists.

7. The optical arrangement of claim 1, wherein the carrier consists of a material the rigidity of which is greater than that of the material of which the basic body of the lens and/or the retaining element consists.

8. The optical arrangement of claim 1, wherein the retaining element is affixed by an affixing means with high viscosity to the carrier and/or the basic body of the lens in such a manner that it can be pivoted.

9. The optical arrangement of claim 1, wherein retaining elements are located on two opposite sides of the lens and these retaining elements together with the optical axis develop a shared plane.

10. An optical arrangement comprising:
   an optical component with a basic body;
   at least one retaining element, which is designed as an integral element of the optical component or is actively connected to the optical component, wherein a first end of the retaining element, which faces towards the optical component, is affixed on a first contact position of the basic body; and
   a carrier, on which the optical component is supported by means of the retaining element, wherein a second end of the retaining element, which faces away from the optical component, is affixed on a second contact position of the carrier,
   wherein the retaining element is arranged to be pivoted between the first contact position and the second contact position,
   wherein the second contact position of the carrier comprises a groove, the groove having a bottom surface and a side surface, wherein the second end of the retaining element engages the groove,
   wherein the second end of the retaining element contacts the bottom surface of the groove, and a side portion of the retaining element contacts the side surface of the groove, and
   wherein due to a thermal expansion of at least one of the basic body or of the retaining element a return force is generated in a spring element, which counteracts a movement of the first contact position along the optical axis caused by the thermal expansion of the at least one of the basic body and/or of the retaining element.

\* \* \* \* \*